US010977182B2

(12) United States Patent
Malshe et al.

(10) Patent No.: US 10,977,182 B2
(45) Date of Patent: Apr. 13, 2021

(54) LOGICAL BLOCK MAPPING BASED ON AN OFFSET

(71) Applicant: Micron Technology, Inc., Boise, ID (US)

(72) Inventors: Ashutosh Malshe, Fremont, CA (US); Karl D. Schuh, Santa Cruz, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/191,364

(22) Filed: Nov. 14, 2018

(65) Prior Publication Data
US 2019/0171576 A1 Jun. 6, 2019

Related U.S. Application Data

(60) Provisional application No. 62/593,758, filed on Dec. 1, 2017.

(51) Int. Cl.
*G06F 12/02* (2006.01)
*G06F 12/10* (2016.01)

(52) U.S. Cl.
CPC ............ *G06F 12/10* (2013.01); *G06F 12/023* (2013.01); *G06F 12/0223* (2013.01); *G06F 12/0246* (2013.01); *G06F 12/0292* (2013.01); *G06F 2212/1044* (2013.01); *G06F 2212/657* (2013.01)

(58) Field of Classification Search
None
See application file for complete search history.

(56) References Cited

U.S. PATENT DOCUMENTS

| 5,490,264 A * | 2/1996 | Wells ..................... G11C 29/88 711/100 |
| 5,943,693 A * | 8/1999 | Barth ..................... G11C 29/76 365/200 |
| 2005/0144361 A1* | 6/2005 | Gonzalez ............ G06F 12/0246 711/103 |
| 2005/0144516 A1* | 6/2005 | Gonzalez ............... G11C 29/76 714/6.13 |

(Continued)

FOREIGN PATENT DOCUMENTS

| EP | 2998869 A1 | 3/2016 |
| WO | 2012121968 A2 | 9/2012 |

OTHER PUBLICATIONS

Structured Computer Organization by Andrew S. Tanenbaum published 2006, ISBN 0-13-148521-0, pp. 12 (Year: 2006).*

(Continued)

*Primary Examiner* — Kaushikkumar M Patel
(74) *Attorney, Agent, or Firm* — Lowenstein Sandler LLP

(57) ABSTRACT

An offset can be determined based on a characteristic of a memory system associated with a system block. The system block corresponds to logical blocks. A first group of physical blocks of the memory system can be assigned to a group of the plurality of logical blocks of the system block. A second group of physical blocks of the memory system can be identified at a location that is based on the offset and the first group of physical blocks. Furthermore, the second group of physical blocks of the memory system can be assigned to another group of the plurality of logical blocks associated with the system block. Data can be stored by using the system block with the first group and second group of physical blocks.

16 Claims, 8 Drawing Sheets

(56) References Cited

U.S. PATENT DOCUMENTS

| | | | | |
|---|---|---|---|---|
| 2007/0101096 A1* | 5/2007 | Gorobets | ............ | G06F 12/0246 711/203 |
| 2009/0089482 A1* | 4/2009 | Traister | ................. | G11C 29/32 711/103 |
| 2010/0172179 A1* | 7/2010 | Gorobets | ............ | G06F 12/0866 365/185.09 |
| 2010/0172180 A1* | 7/2010 | Paley | ................. | G06F 12/0246 365/185.12 |
| 2010/0228940 A1* | 9/2010 | Asnaashari | ......... | G06F 12/0246 711/170 |
| 2012/0304039 A1* | 11/2012 | Peterson | ................. | G06F 11/10 714/773 |
| 2014/0189210 A1 | 7/2014 | Sinclair et al. | | |
| 2014/0241098 A1 | 8/2014 | Son et al. | | |
| 2014/0281141 A1* | 9/2014 | Manohar | ............. | G06F 12/0246 711/103 |
| 2015/0134885 A1* | 5/2015 | Yeung | ................. | G11C 16/349 711/103 |
| 2015/0220385 A1* | 8/2015 | Wood | .................... | G06F 11/108 714/6.24 |
| 2015/0347058 A1* | 12/2015 | Lam | .................... | G06F 12/0875 711/103 |
| 2016/0188206 A1* | 6/2016 | Sinclair | ................... | G06F 3/061 711/103 |
| 2017/0024127 A1 | 1/2017 | Bazarsky et al. | | |
| 2017/0060461 A1* | 3/2017 | Erez | ..................... | G06F 1/3296 |

OTHER PUBLICATIONS

International Search Report and Written Opinion for International Application No. PCT/US2018/063463, dated Mar. 12, 2019, 11 pages.

* cited by examiner

|   | 0 | 1 | 2 | 3 | 4 | 5 | 6 | 7 | ... |
|---|---|---|---|---|---|---|---|---|---|
| 0 | 0 | 1 | 2 | 3 | | | | | |
| 0 | 0 | 1 | 2 | 3 | | | | | |
| 0 | 4 | 5 | 6 | 7 | | | | | |
| 0 | 8 | 9 | 10 | 11 | | | | | |
| 0 | 12 | 13 | 14 | 15 | | | | | |
| 0 | 16 | 17 | 18 | 19 | | | | | |
| 0 | 20 | 21 | 22 | 23 | | | | | |
| 0 | 24 | 25 | 26 | 27 | | | | | |
| 0 | 28 | 29 | 30 | 31 | | | | | |
| 1 | 0 | 1 | 2 | 3 | | | | | |
| 1 | 4 | 5 | 6 | 7 | | | | | |
| 1 | 8 | 9 | 10 | 11 | | | | | |
| 1 | 12 | 13 | 14 | 15 | | | | | |
| 1 | 16 | 17 | 18 | 19 | | | | | |
| 1 | 20 | 21 | 22 | 23 | | | | | |
| 1 | 24 | 25 | 26 | 27 | | | | | |
| 1 | 28 | 29 | 30 | 31 | | | | | |
| 2 | 0 | 1 | 2 | 3 | | | | | |
| 2 | 4 | 5 | 6 | 7 | | | | | |
| 2 | 8 | 9 | 10 | 11 | | | | | |
| 2 | 12 | 13 | 14 | 15 | | | | | |
| 2 | 16 | 17 | 18 | 19 | | | | | |
| 2 | 20 | 21 | 22 | 23 | | | | | |
| 2 | 24 | 25 | 26 | 27 | | | | | |
| 2 | 28 | 29 | 30 | 31 | | | | | |
| 3 | 0 | 1 | 2 | 3 | | | | | |
| 3 | 4 | 5 | 6 | 7 | | | | | |
| 3 | 8 | 9 | 10 | 11 | | | | | |
| 3 | 12 | 13 | 14 | 15 | | | | | |
| 3 | 16 | 17 | 18 | 19 | | | | | |
| 3 | 20 | 21 | 22 | 23 | | | | | |
| 3 | 24 | 25 | 26 | 27 | | | | | |
| 3 | 28 | 29 | 30 | 31 | | | | | |

LOGICAL BLOCK MAPPING BASED ON AN OFFSET

RELATED APPLICATION

This application claims the benefit under 35 U.S.C. § 119(e) of U.S. Provisional Application 62/593,758 filed on Dec. 1, 2017.

TECHNICAL FIELD

The present disclosure generally relates to a memory system, and more specifically, relates to logical block mapping based on an offset in memory systems.

BACKGROUND

A memory system can be a storage system, such as a solid-state drive (SSD), and can include one or more memory devices that store data. A memory system can include memory devices such as non-volatile memory devices and volatile memory devices. In general, a host system can utilize a memory system to store data at the memory devices of the memory system and to retrieve data from the memory devices of the memory system.

BRIEF DESCRIPTION OF THE DRAWINGS

The present disclosure will be understood more fully from the detailed description given below and from the accompanying drawings of various implementations of the disclosure.

FIG. 3B illustrates another example block mapping for another system block in accordance with some embodiments of the present disclosure.

FIG. 3D illustrates another example block mapping for another system block in accordance with some embodiments of the present disclosure.

DETAILED DESCRIPTION

Figure 1:
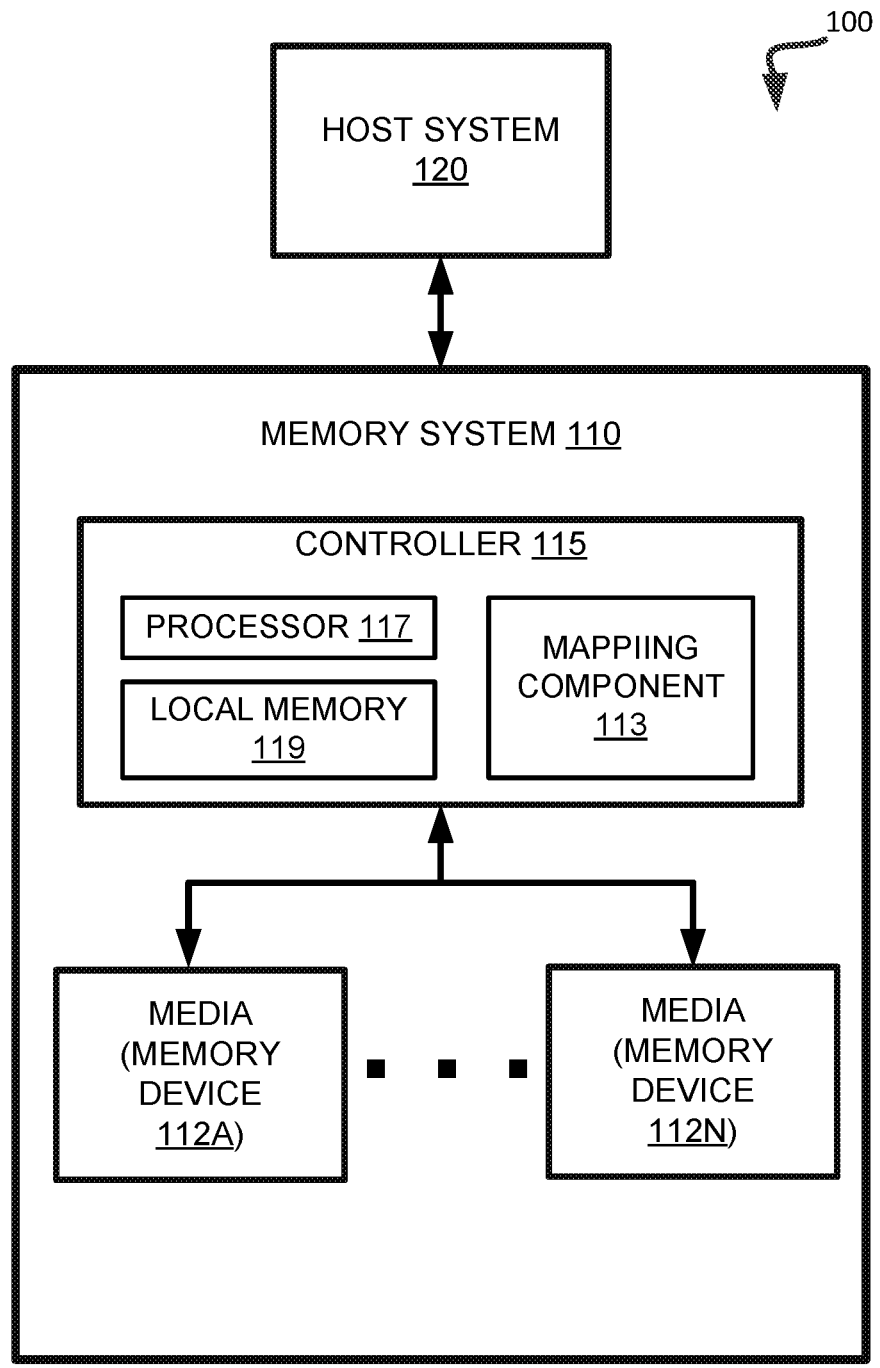
FIG. 1 illustrates an example computing environment that includes a memory system in accordance with some embodiments of the present disclosure.

A host system can utilize a memory system that includes one or more memory devices. The host system can provide write requests to store data at the memory system and can provide read requests to retrieve the data at the memory system. The host system can use a mapping of logical blocks to physical blocks of the memory devices to write data to and read data from the memory system. For example, each logical block can be mapped to a particular physical block at a particular memory device of the memory system. When the host system identifies an address of a particular logical block to write data to or read data from, the data can be written to or read from the physical block that is mapped to the identified logical block. As a result, the host system can identify logical blocks to store or retrieve data and the corresponding data can be stored at or retrieved from the physical blocks that are mapped to the logical blocks. Different logical blocks can be mapped to different physical blocks at different memory devices that are included in the memory system.

A conventional memory system can manage the mapping between the logical blocks specified by the host system and the physical blocks of the memory devices. For example, the memory system can determine which of the physical blocks are to be mapped to particular logical blocks. The memory system can further manage the writing of data from the host system to the memory devices of the memory system by using a system block that is a group of logical blocks. The system block can correspond to logical blocks that are operated on by the memory system as a group. Such operations may include, but are not limited to, an erase operation, which when performed on the system block, can result in an erase operation being performed on each physical block that is mapped to the logical blocks of the system block. The system block can be a stripe of data that is managed by the memory system. For example, a stripe can be a sequence of user data blocks that have been received from the host system and that are stored as a group at the memory system. Thus, the system block can be logical blocks of user data that have been grouped together by the memory system.

As write requests from the host system are received by the memory system, the data can be stored within logical blocks that are assigned to a particular system block. Once the logical blocks that are assigned to the particular system block are each used to store data at a corresponding physical block (e.g., the particular system block is full), the memory system can store subsequent data at a new system block. For example, new logical blocks can be mapped to new physical blocks for the new system block. As such, data can be stored at the memory devices of the memory system in different groups of logical blocks.

As previously described, the logical blocks can be mapped to physical blocks of memory devices that are included in the memory system. The logical blocks can be mapped to physical blocks in an order across a memory device in a conventional memory system. For example, the logical blocks can be mapped to the physical blocks in order of the physical locations of the physical blocks across the memory device (e.g., across a row of physical blocks of the memory device). A particular memory device can include a manufacturing defect where as part of the manufacturing process, a particular physical block can be defective and unable to store data. If the logical blocks of a system block are mapped to the physical blocks in the order of the physical blocks being located in a row of the memory device and if a group of the physical blocks proximate to each other are unable to store data as a result of the manufacturing defect, then a significant number of the logical blocks of the system block can be mapped to a large number of defective physical blocks that are unable to store data. A system block that includes a large number of defective physical blocks can be associated with decreased performance as throughput of the memory system can be lowered as a result of the defective physical blocks. For example, when the number of defective physical blocks assigned to logical blocks of a particular system block exceeds a threshold number, then the data at the remaining physical blocks assigned to the logical blocks of the particular system block can be redistributed to another system block with another mapping of other logical blocks to other physical blocks. Such redistributing of the data from the physical blocks to the other physical blocks mapped to the other logical blocks of the other system block can take an amount of time during which the data being redistributed may not be accessed in response to a read operation provided by a host system. Furthermore, the redistributing of the data can correspond to writing the data from a prior physical block to one of the other physical blocks, which can result in other write operations provided by the host system to be delayed as the conventional memory system performs the write operation of the data from the prior physical block to the other physical block.

Aspects of the present disclosure address the above and other deficiencies by assigning a diagonal block mapping or arrangement between logical blocks and physical blocks so that the physical blocks that are assigned to the logical blocks of a system block are distributed across different portions of a memory device or different portions of multiple memory devices. For example, instead of mapping the logical blocks to physical blocks in a physical order across a row of a memory device (or column or other such arrangement), the diagonal block mapping can map the logical blocks of a system block to physical blocks across different locations within a memory device. For example, mapping the logical blocks to physical blocks across different locations at different memory devices can result in a first number of logical blocks of a system block being mapped to a first number of physical blocks at a first memory device where the first number of physical blocks are located in a first position or row of the first memory device. A second number of the logical blocks can be mapped to a second number of physical blocks at a second memory device where the second number of physical blocks are located in a second position or row of the second memory device. Thus, the system block can include logical blocks that are mapped to physical blocks that are distributed across different rows or locations of different memory devices.

In another example, the diagonal block mapping can map the logical blocks of a system block to physical blocks across different planes of a single memory device. Each plane of a memory device can correspond to a portion of the memory device (e.g., a portion of the physical blocks) and can be capable of independently performing concurrent identical operations (e.g., write operations, read operations, or erase operations on physical blocks in the same plane). Such a diagonal block mapping can result in a first number of logical blocks of a system block being mapped to a first number of physical blocks at a first memory device where the first number of physical blocks are located in a first position or row at a first group of planes of the first memory device. A second number of the logical blocks can be mapped to a second number of physical blocks at the same first memory device, where the second number of physical blocks can be located in a second position or row at a second group of planes of the same first memory device. Subsequently, a third number of the logical blocks can be mapped to a third number of physical blocks at a third location or row (e.g., different than the first or second row) at a different second memory device. Thus, the logical blocks assigned to a single system block can include physical blocks at different planes of different memory devices. Further details with regards to the mapping of logical blocks to physical blocks are described below.

The mapping of the logical blocks to physical blocks based on the diagonal block mapping can be based on an offset that is determined based on characteristics of a memory system. For example, the offset can be determined based on a number of physical blocks that are included in each memory device and a number of planes that are included in each memory device. The offset can be used to determine a shape or path of the diagonal block mapping for a system block. In some embodiments, the diagonal mapping can be based on a memory device offset that defines which portions of the memory device can be assigned to a system block, a plane offset which can define which portions of planes are assigned to the system block, and/or a diagonal offset that can define which portions of planes and memory devices are assigned to the system block. For example, such offset values can specify the location or row of different groups of physical blocks that are assigned to a system block.

Advantages of the present disclosure include, but are not limited to, an improved performance of the memory system. For example, the diagonal block mapping can result in the defective physical blocks being more evenly distributed between the various system blocks since such defective physical blocks can be approximate to each other at a single location within a single memory device. As a result, fewer redistribution operations can be performed as fewer system blocks can be indicated to be unusable when a threshold number of defective physical blocks have been assigned to the corresponding system block. Thus, throughput of the memory system can be increased (e.g., write, read, or erase operations can be performed more quickly) and additional capacity of the memory system can be utilized as the physical blocks assigned to a system block may not be indicated to be incapable of storing data as frequently.

FIG. 1 illustrates an example computing environment 100 that includes a memory system 110 in accordance with some implementations of the present disclosure. The memory system 110 can include media, such as memory devices 112A to 112N. The memory devices 112A to 112N can be volatile memory devices, non-volatile memory devices, or a combination of such. In some embodiments, the memory system is a storage system. An example of a storage system is a SSD. In general, the computing environment 100 can include a host system 120 that uses the memory system 110. In some implementations, the host system 120 can write data to the memory system 110 and read data from the memory system 110. In some embodiments, the memory system 110 is a hybrid memory/storage system.

The host system 120 can be a computing device such as a desktop computer, laptop computer, network server, mobile device, or such computing device that includes a memory and a processing device. The host system 120 can include or be coupled to the memory system 110 so that the host system 120 can read data from or write data to the memory system 110. The host system 120 can be coupled to the memory system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory system 110. The host system 120 can further utilize an NVM Express (NVMe) interface to access the memory devices 112A to 112N when the memory system 110 is coupled with the host system 120 by the PCIe interface. The physical host interface can provide an interface for passing control, address, data, and other signals between the memory system 110 and the host system 120.

The memory devices 112A to 112N can include any combination of the different types of non-volatile memory devices and/or volatile memory devices. An example of non-volatile memory devices includes a negative-and (NAND) type flash memory. Each of the memory devices 112A to 112N can include one or more arrays of memory cells such as single level cells (SLCs) or multi-level cells (MLCs) (e.g., triple level cells (TLCs) or quad-level cells (QLCs)). In some implementations, a particular memory device can include both an SLC portion and a MLC portion of memory cells. Each of the memory cells can store bits of data (e.g., data blocks) used by the host system 120. Although non-volatile memory devices such as NAND type flash memory are described, the memory devices 112A to 112N can be based on any other type of memory such as a volatile memory. In some implementations, the memory devices 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross point non-volatile memory can perform a write in-place operation, where a non-volatile memory cell can be programmed without the non-volatile memory cell being previously erased. Furthermore, the memory cells of the memory devices 112A to 112N can be grouped as memory pages or data blocks that can refer to a unit of the memory device used to store data.

The controller 115 can communicate with the memory devices 112A to 112N to perform operations such as reading data, writing data, or erasing data at the memory devices 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory system 110, including handling communications between the memory system 110 and the host system 120. In some embodiments, the local memory 119 can include memory registers storing memory pointers, fetched data, etc. The local memory 119 can also include read-only memory (ROM) for storing micro-code. While the example memory system 110 in FIG. 1 has been illustrated as including the controller 115, in another embodiment of the present disclosure, a memory system 110 may not include a controller 115, and may instead rely upon external control (e.g., provided by an external host, or by a processor or controller separate from the memory system).

In general, the controller 115 can receive commands or operations from the host system 120 and can convert the commands or operations into instructions or appropriate commands to achieve the desired access to the memory devices 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory devices 112A to 112N. The controller 115 can further include host interface circuitry to communicate with the host system 120 via the physical host interface. The host interface circuitry can convert the commands received from the host system into command instructions to access the memory devices 112A to 112N as well as convert responses associated with the memory devices 112A to 112N into information for the host system 120.

The memory system 110 can include a mapping 113 (e.g., circuitry, dedicated logic, programmable logic, firmware, etc.) to perform the operations described herein. In some implementations, the mapping component 113 can determine an offset to be used when mapping logical blocks of a system block to physical blocks of the memory devices 112A to 112N. For example, the mapping component 113 can identify a number of physical blocks in a memory device 112A to 112N and/or a number of planes in a memory device 112A to 112N. Subsequently, the identified number of physical blocks and/or number of planes can be used to specify an offset that is used to map physical blocks in a diagonal position to the logical blocks of a system block).

The memory system 110 can also include additional circuitry or components that are not illustrated. In some implementations, the memory system 110 can include a cache or buffer (e.g., DRAM) and address circuitry (e.g., a row decoder and a column decoder) that can receive an address from the controller 115 and decode the address to access the memory devices 112A to 112N.

Figure 2:
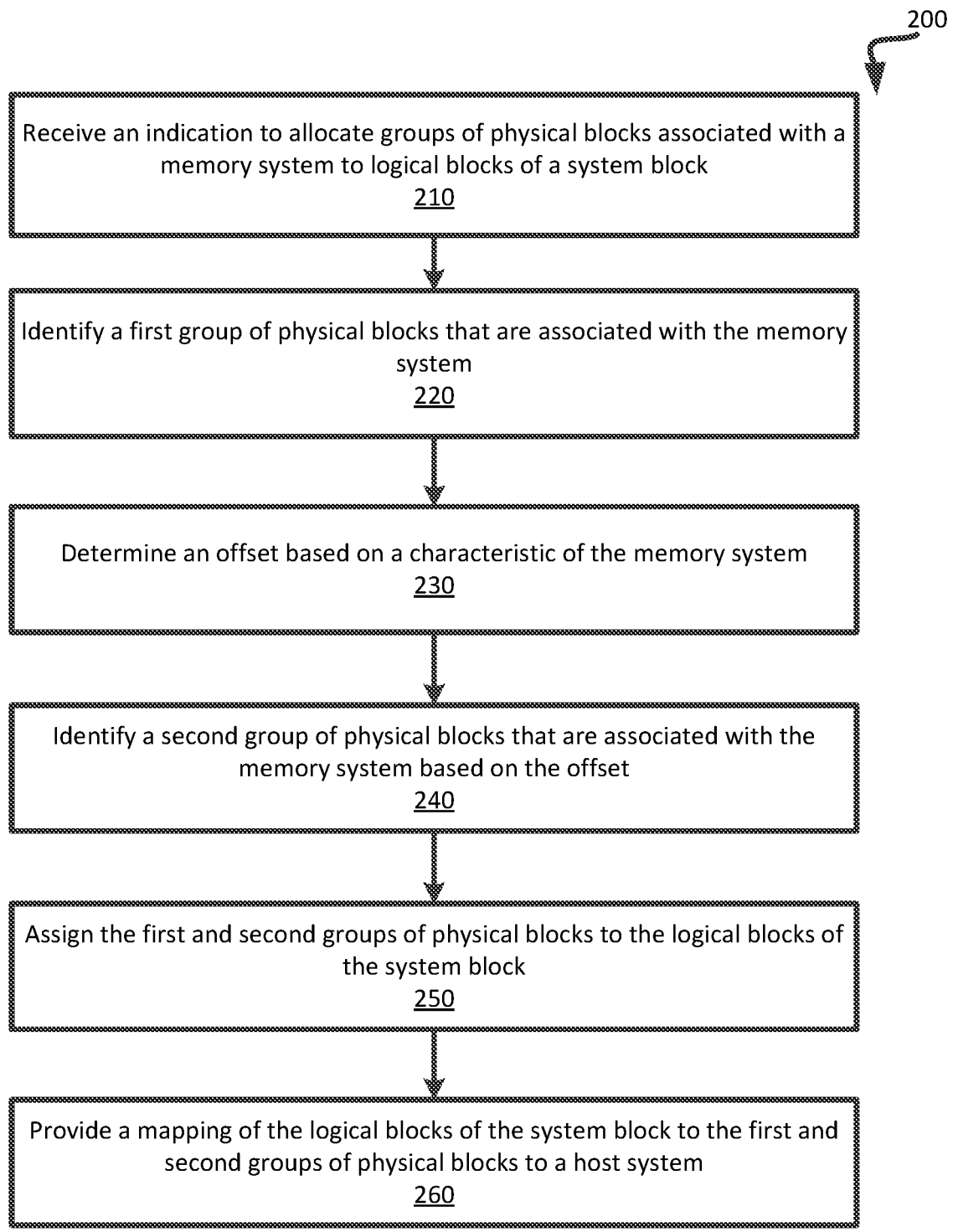
FIG. 2 is a flow diagram of an example method to assign physical blocks of the memory system to logical blocks of a system block in accordance with some embodiments.

FIG. 2 is a flow diagram of an example method 200 to assign physical blocks of the memory system to logical blocks of a system block in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 can be performed by the mapping component 113 of FIG. 1.

As shown in FIG. 2, at block 210, processing logic can receive an indication to allocate groups of physical blocks associated with a memory system to logical blocks of a system block. The indication can be that a host system is providing data to be written to the physical blocks at one or more memory devices of a memory system. In some embodiments, the indication can be that each of the logical blocks of a prior system block has been used to store data from a host system. The system block can be a group of logical blocks that are mapped to physical blocks that store data provided by the host system.

At block 220, the processing logic can identify a first group of physical blocks that are associated with the memory system. The first group of physical blocks may not currently store data from the host system. In some embodiments, the memory system can include multiple memory devices and the first group of physical blocks can be from a single memory device of the multiple memory devices included in the memory system.

At block 230, the processing logic can determine an offset based on a characteristic of the memory system. The offset can be used to specify a location of another physical block relative to a location of the first group of physical blocks. In some embodiments, the offset can be based on the number of physical blocks that are included in each memory device in the memory system and a number of planes that are included in each memory device. In the same or alternative embodiments, the offset can be based on a number of memory devices or die that are included in the memory system. The use of the offset is further described below.

Referring to FIG. 2, at block 240, the processing logic can identify a second group of physical blocks that are associated with the memory system based on the offset. The physical blocks from the second group may not currently store data from the host system. Furthermore, the second group of data blocks can be at a position or location in the memory system that is relative to the position or location of the first group of data blocks. For example, the location of the first physical block of the second group can be based on the location of the last physical block of the first group and the offset. The offset can be used to specify physical blocks at a particular row of a particular memory device should be included in the second group relative to the location of the first group. The location of the second group can be at a different memory device, different plane, and/or a different row of a memory device as described in further detail with respect to FIGS. 3A-3D.

At block 250, the processing logic can subsequently assign the first and second groups of physical blocks to the logical blocks of the system block. Thus, the assigning of physical blocks to the logical blocks of the system block can be based on an offset and the location of a prior group of physical blocks that has been assigned to the logical blocks.

At block 260, the processing logic can further provide a mapping of the logical blocks of the system block to the first and second groups of physical blocks to a host system. For example, after the groups of physical blocks are assigned to each of the logical blocks of the system block, the system block can be used to store data from a host system. For example, as new data is received from the host system to be stored at the memory system, the new data can be stored at the physical blocks assigned to the logical blocks of the system block. The host system can then subsequently retrieve the data stored at the physical blocks by identifying logical block addresses of the corresponding logical blocks that are assigned to the physical blocks.

Although FIG. 2 describes assigning a first group and second group of physical blocks to the logical blocks of a system block, any number of groups of physical blocks can be assigned to the logical blocks of the system block.

Figure 3A:
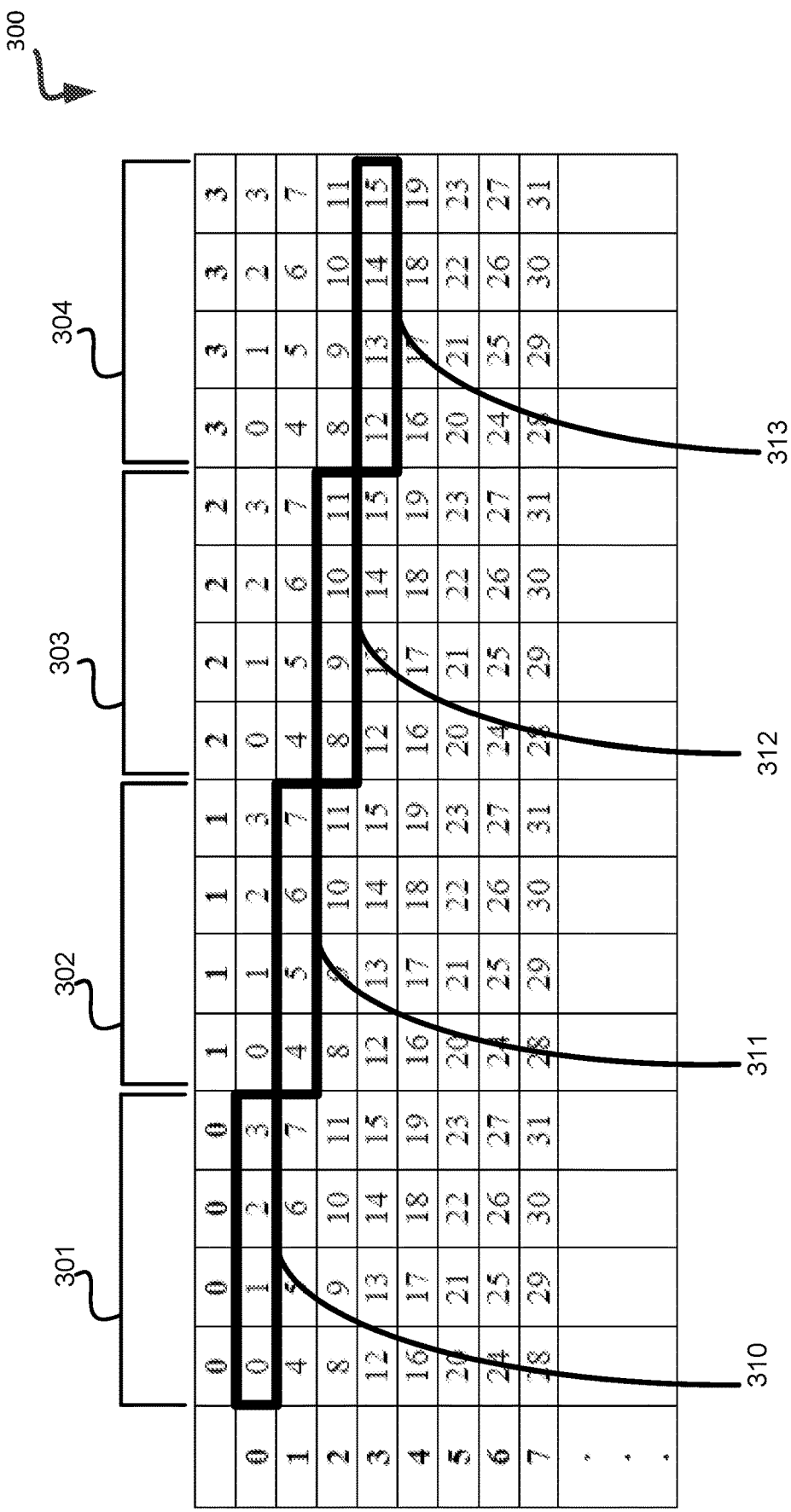
FIG. 3A illustrates an example block mapping for a system block in accordance with some embodiments of the present disclosure.

FIG. 3A illustrates an example block mapping 300 for a system block in accordance with some embodiments of the present disclosure. The block mapping 300 can be performed by the mapping component 113 of FIG. 1.

As shown in FIG. 3A, the block mapping 300 may represent physical blocks at memory devices of a memory system that are assigned to logical blocks of a system block. For example, the memory system can include multiple memory devices such as memory device 301 (e.g., memory device '0' as represented by the top row), memory device 302 (e.g., memory device '1'), memory device 303 (e.g., memory device '2'), and memory device 304 (e.g., memory device '3'). Each of the memory devices 301, 302, 303, and 304 can include rows of physical blocks that are mapped to logical blocks of a system block. For example, the first group of physical blocks 310 at the row '0' of the memory device 301 can be assigned to the first four logical blocks of a system block.

The offset of the block mapping 300 can specify that the next physical blocks assigned to the system block can be at a next row (or other such index position indicating a particular position within a memory device) of the next memory device relative to the first group of physical blocks 310. For example, the offset can specify that the second group of physical blocks 311 at the next memory device 302 and a row '1' that is incremented a value from the row '0' are the next physical blocks to be assigned to the next four logical blocks of the system block. Similarly, the offset can specify that the third group of physical blocks 312 at the next memory device 303 at a next row '2' are to be assigned to the next four logical blocks of the system block and the fourth group of physical blocks 313 at the next memory device 304 and the next row '3' relative to the third group of physical blocks 312 are to be assigned to the later four logical blocks of the system block. Thus, the offset can specify that a subsequent group of physical blocks that are at a next incremented row at the next memory device relative to the prior assigned group of physical blocks are to be assigned as the next logical blocks of the system block.

Furthermore, after each logical block of the system block has been assigned to the physical blocks of the memory devices 301, 302, 303, and 304, the logical blocks of another system block can be assigned to other groups of physical blocks. For example, the other groups of physical blocks can be at a row below the groups of physical blocks 310, 311, 312, and 313. For example, row '1' of the memory device 301, row '2' of the memory device 302, row '3' of the memory device 303, and row '4' of the memory device 304 can be assigned to the logical blocks of the other system block.

FIG. 3B illustrates another example block mapping 320 of another system block in accordance with some embodiments of the present disclosure. The block mapping 320 can be performed by the mapping component 113 of FIG. 1. As shown, the offset can specify that a subsequent group of physical blocks to be assigned to logical blocks of another system block are to be located at the next memory device and two rows from a prior group of physical blocks that have been assigned to the logical blocks of the system block. Thus, the offset can be used to specify a different row of physical blocks to be assigned to the logical blocks.

Figure 3C:
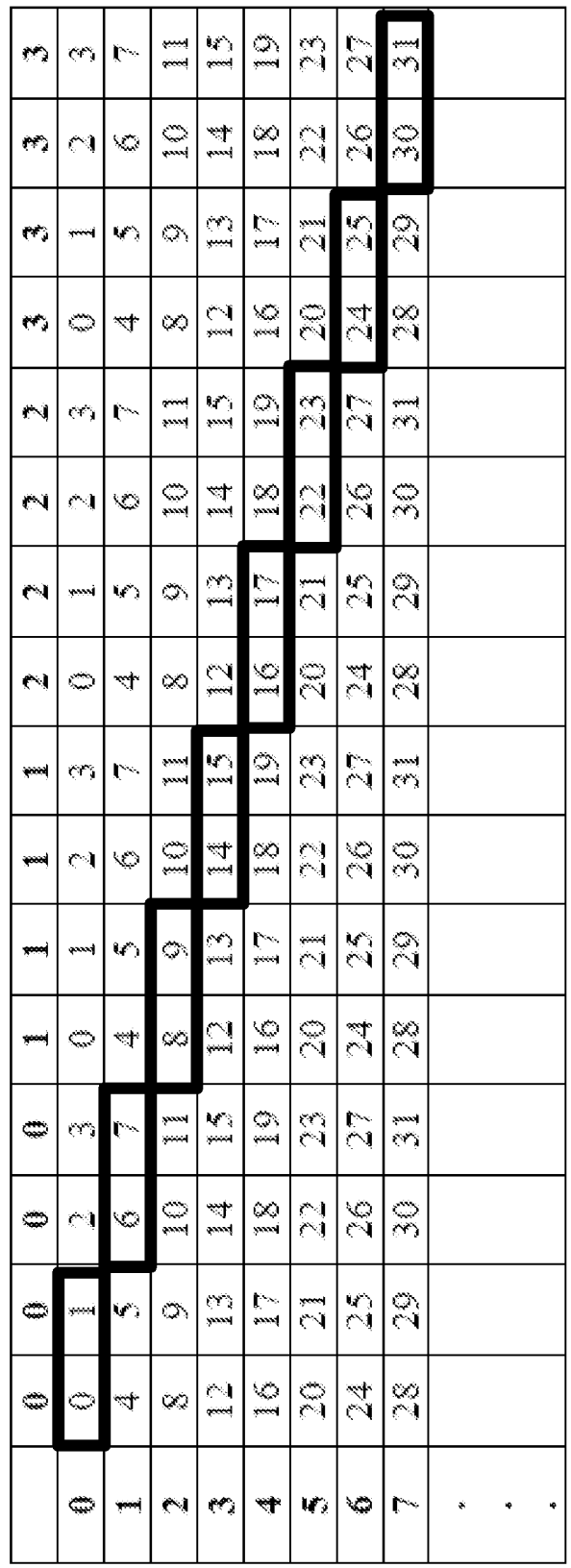
FIG. 3C illustrates another example block mapping for another system block in accordance with some embodiments of the present disclosure.

FIG. 3C illustrates another example block mapping 330 of another system block that can be performed by the mapping component 113 of FIG. 1 in accordance with some embodiments of the present disclosure. As shown, the offset can specify that a subsequent group of physical blocks to be assigned to logical blocks of the system block are to be located at the next row relative to the prior group of physical blocks that have been assigned to the logical blocks of the system block. The offset can further specify that the next row may be at different planes within the same memory device that includes the prior group of physical blocks. For example, each memory device can include two groups of physical blocks to be assigned to the system block where a first group is at a particular row within a memory device and at two planes (e.g., plane '0' and plane '1' as represented by the second row) of the memory device and a second group is at a next row within the same memory device and at the other two planes of the same memory device (e.g., planes '2' and '3'). A subsequent group can then be at the next row at the next memory device relative to the second group at the similar planes as the first group of physical blocks (e.g., planes '0' and '1' of the next memory device). Furthermore, the number of physical blocks in each group that are assigned to the logical blocks of the system block can be based on the offset. For example, as shown, the offset can further specify that each group of physical blocks is two physical blocks in size as opposed to four physical blocks in size as illustrated in FIGS. 3B and 3A.

As previously described, each plane of a memory device can correspond to a portion of the physical blocks of the memory device and can be capable of independently performing concurrent identical operations. In the representation of the memory devices from FIGS. 3A-3D, the planes can be represented by each column of a memory device. For example, physical blocks '0,' '4,' '8,' '12,' '16,' '20,' '24,' and '28' can be within a same plane of a particular memory device.

Figure 3D:
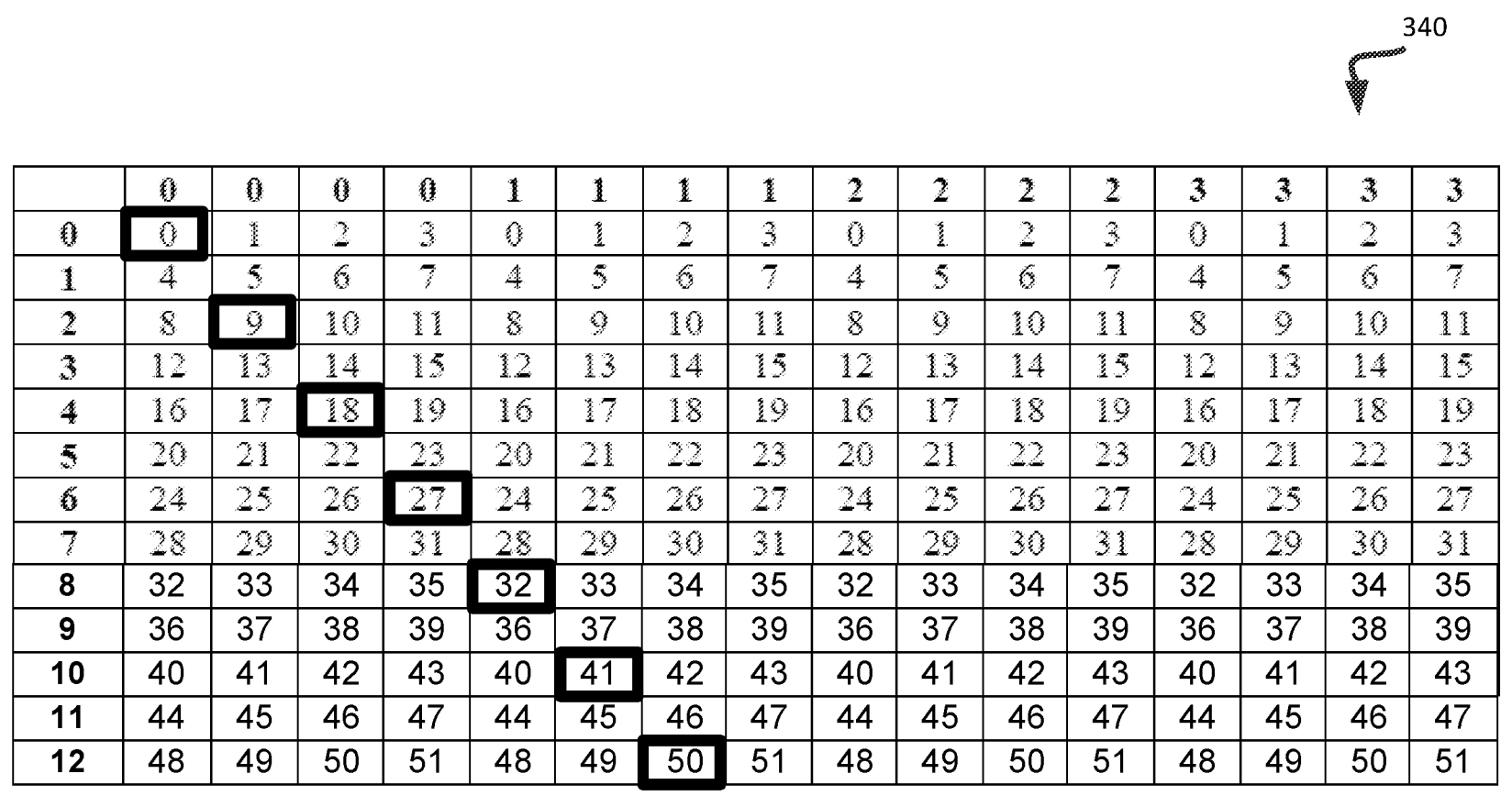

FIG. 3D illustrates another example block mapping 340 of another system block in accordance with some embodiments of the present disclosure. The block mapping 340 can be performed by the mapping component 113 of FIG. 1. As shown, the offset can specify that a subsequent a physical block to be assigned to a logical block of a system block is to be located at two rows in the next plane from the prior physical block that has been assigned to a prior logical block of the system block. In some embodiments, the offset can specify that after a physical block from each plane of a memory device has been assigned to a logical block of the system block, then a physical block at the first plane of the next memory device can be assigned to the next logical block of the system block.

As such, the offset can specify one or both of a memory device offset that is used to specify the next memory device for a next group of physical blocks to assign to the logical blocks of a system block, a plane offset that can be used to specify a next plane in a memory device for a next group of physical blocks to be assigned, and/or a row offset that can be used to specify a new row in a memory device for the next group of physical blocks to be assigned. Thus, the offset can be used to specify different index positions (e.g., rows) between a group of physical blocks and a next group of physical blocks.

Figure 4:
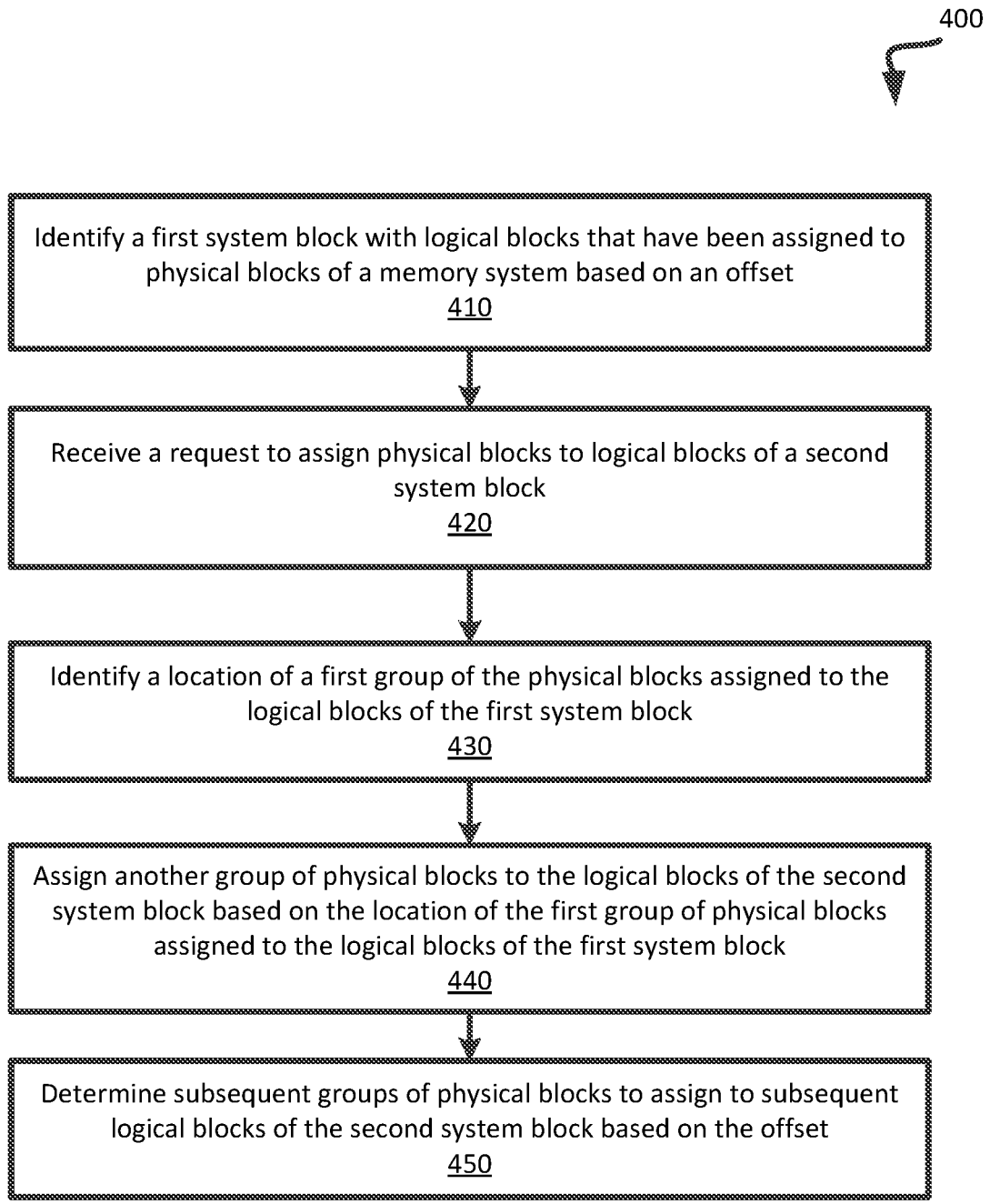
FIG. 4 is a flow diagram of an example method to identify a second group of physical blocks based on an offset and a location of a first group of physical blocks in accordance with some embodiments.

FIG. 4 is a flow diagram of an example method 400 to identify a second group of physical blocks based on an offset and a location of a first group of physical blocks in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 can be performed by the mapping component 113 of FIG. 1.

As shown in FIG. 4, at block 410, the processing logic can identify a first system block with logical blocks that have been assigned to physical blocks of a memory system based on an offset. For example, each logical block of the first system block can be mapped to physical blocks of the memory system.

At block 420, the processing logic can receive a request to assign physical blocks to logical blocks of a second system block. The request can be in response to each of the logical blocks of the first system block being assigned to physical blocks of the memory system. For example, the second system block can be identified after the first system block has been assigned to the physical blocks of the memory system.

At block 430, the processing logic can subsequently identify a location of a first group of the physical blocks assigned to the logical blocks of the first system block. For example, a row of a first memory device that includes the first group of the physical blocks can be identified. The first group of the physical blocks can be assigned to the first logical blocks of the first system block.

At block 440, the processing logic can assign another group of physical blocks to the logical blocks of the second system block based on the location of the first group of physical blocks assigned to the logical blocks of the first system block. For example, the other group of physical blocks assigned to the logical blocks of the second system block can be at a row below the first physical blocks assigned to the first system block within the same first memory device. Furthermore, the other group of physical blocks can be assigned to the first logical blocks of the second system block. The first group of physical blocks and the other group of physical blocks can include the same number of physical blocks.

At block 450, the processing logic can determine subsequent groups of physical blocks to assign to subsequent logical blocks of the second system block based on the offset. The offset used to assign physical blocks to the subsequent logical blocks of the second system block can be the same offset that was used to identify physical blocks that were assigned to logical blocks of the first system block. As such, the same offset can be used to identify subsequent groups of physical blocks for different system blocks. For example, the offset can be used to identify a location for a subsequent group of physical blocks relative to a location of a prior group of physical blocks for a subsequent system block.

Figure 5:
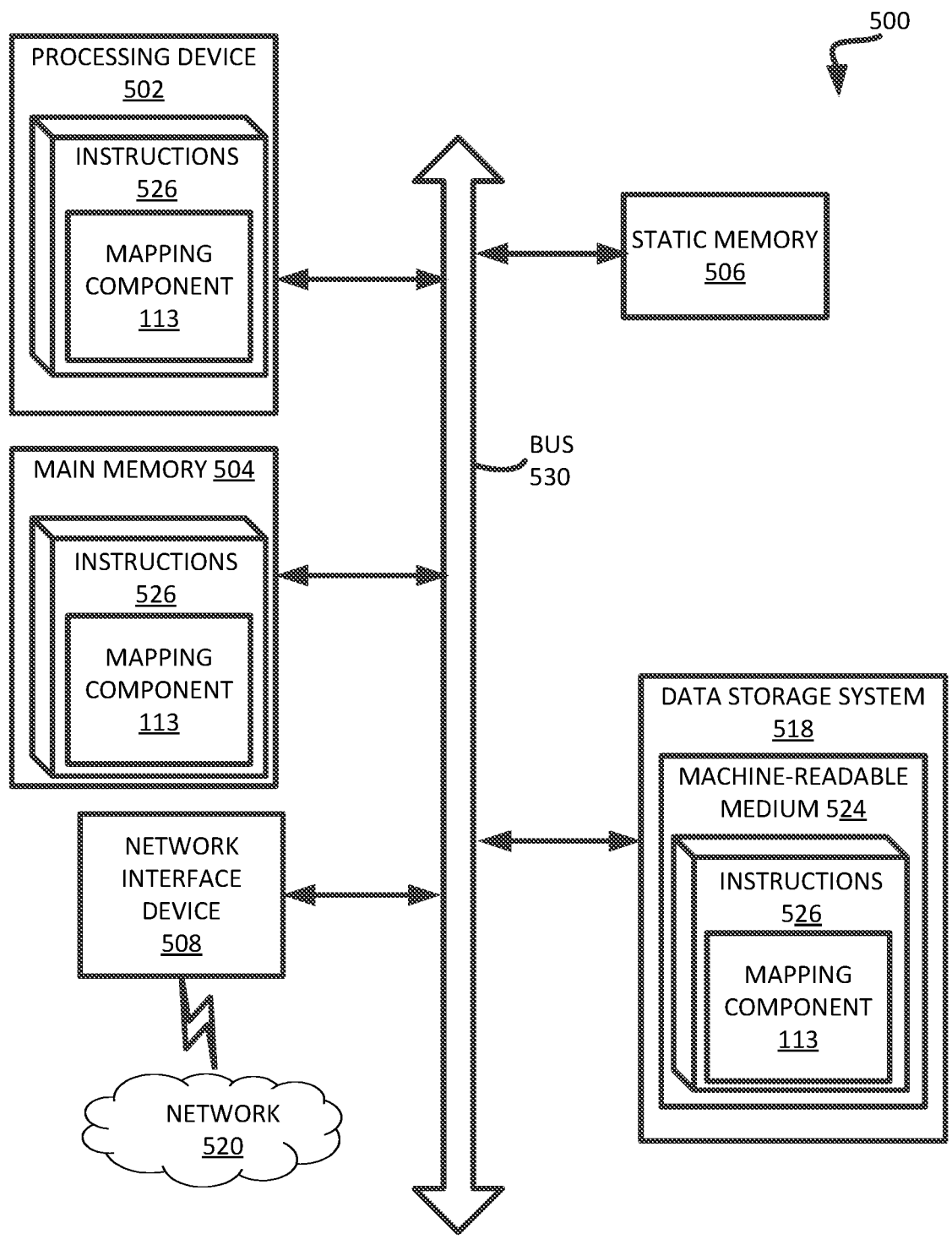
FIG. 5 is a block diagram of an example computer system in which implementations of the present disclosure may operate.

FIG. 5 illustrates an example machine of a computer system 500 within which a set of instructions, for causing the machine to perform any one or more of the methodologies discussed herein, can be executed. In some implementations, the computer system 500 can correspond to a host system (e.g., the host system 120 of FIG. 1) that includes or utilizes a memory system (e.g., the memory system 110 of FIG. 1) or can be used to perform the operations of a controller (e.g., to execute an operating system to perform operations corresponding to the mapping component 113 of FIG. 1). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions or software 526 embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory system 110 of FIG. 1.

In one implementation, the instructions 526 include instructions to implement functionality corresponding to a mapping component (e.g., the mapping component 113 of FIG. 1). While the machine-readable storage medium 524 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
 identifying, by a processing device, an offset based on a characteristic of a memory system associated with a system block corresponding to a plurality of logical blocks, wherein the characteristic of the memory system corresponds to a number of memory devices that are included in the memory system and to a number of planes that are included in each of the memory devices, and wherein each of the memory devices comprises a plurality of planes;

assigning, by the processing device, a first group of physical blocks of the memory system to a first group of the plurality of logical blocks corresponding to the system block, wherein the first group of physical blocks comprise a first plurality of physical blocks;

identifying, by the processing device, a second group of physical blocks of the memory system at a location that is based on the offset and the first group of physical blocks, wherein the second group of physical blocks comprises a second plurality of physical blocks;

assigning, by the processing device, the second group of physical blocks of the memory system to a second group of the plurality of logical blocks corresponding to the system block;

identifying, by the processing device, a third group of physical blocks of the memory system at a location that is based on the offset and the second group of physical blocks, wherein the third group of physical blocks comprises a third plurality of physical blocks, and wherein the offset is used to identify the location of the third group of physical blocks relative to the location of the second group of physical blocks;

assigning, by the processing device, the third group of physical blocks of the memory system to a third group of the plurality of logical blocks corresponding to the system block; and storing, by the processing device, data by using the system block with the assigned first group, second group, and third group of physical blocks.

2. The method of claim 1, wherein the offset specifies the location of the second group of physical blocks relative to a location of the first group of physical blocks of the memory system.

3. The method of claim 1, wherein the assigning of the first group of physical blocks and the second group of physical blocks comprises:
identifying the first group of physical blocks at a first die of a memory device of the memory system; and
identifying the second group of physical blocks at a second die, wherein the second group of physical blocks at the second die are at a different index position than the first group of physical blocks, the different index position being based on the offset.

4. The method of claim 3, wherein the different index position corresponds to a different row at the second die relative to a row of the first die that includes the first group of physical blocks.

5. The method of claim 1, wherein the assigning of the first group of physical blocks and the second group of physical blocks comprises:
identifying the first group of physical blocks at a first plane of a memory device of the memory system; and
identifying the second group of physical blocks at a second plane of the memory device, wherein the second group of physical blocks at the second plane are at a different index position than the first group of physical blocks at the first plane, the different index position being based on the offset.

6. The method of claim 1, further comprising:
identifying a subsequent system block corresponding to another plurality of logical blocks; and
assigning a particular group of physical blocks to a portion of the another plurality of logical blocks based on a location of the first group of physical blocks assigned to the first group of the plurality of logical blocks of the system block.

7. A system comprising:
a memory; and
a processing device, operatively coupled with the memory, to:
identify an offset based on a characteristic of a memory system associated with a system block corresponding to a plurality of logical blocks, wherein the characteristic of the memory system corresponds to a number of memory devices that are included in the memory system and to a number of planes that are included in each of the memory devices, and wherein each of the memory devices comprises a plurality of planes;
assign a first group of physical blocks of the memory system to a first group of the plurality of logical blocks corresponding to the system block, wherein the first group of physical blocks comprise a first plurality of physical blocks;
identify a second group of physical blocks of the memory system at a location that is based on the offset and the first group of physical blocks, wherein the second group of physical blocks comprises a second plurality of physical blocks;
assign the second group of physical blocks of the memory system to a second group of the plurality of logical blocks corresponding to the system block;
identify a third group of physical blocks of the memory system at a location that is based on the offset and the second group of physical blocks, wherein the third group of physical blocks comprises a third plurality of physical blocks, and wherein the offset is used to identify the location of the third group of physical blocks relative to the location of the second group of physical blocks;
assign the third group of physical blocks of the memory system to a third group of the plurality of logical blocks corresponding to the system block; and
store data by using the system block with the assigned first group, second group, and third group of physical blocks.

8. The system of claim 7, wherein the offset specifies the location of the second group of physical blocks relative to a location of the first group of physical blocks of the memory system.

9. The system of claim 7, wherein to assign the first group of physical blocks and the second group of physical blocks, the processing device is further to:
identify the first group of physical blocks at a first die of a memory device of the memory system; and
identify the second group of physical blocks at a second die, wherein the second group of physical blocks at the second die are at a different index position than the first group of physical blocks, the different index position being based on the offset.

10. The system of claim 9, wherein the different index position corresponds to a different row at the second die relative to a row of the first die that includes the first group of physical blocks.

11. The system of claim 7, wherein to assign the first group of physical blocks and the second group of physical blocks, the processing device is further to:

identify the first group of physical blocks at a first plane of a memory device of the memory system; and identify the second group of physical blocks at a second plane of the memory device, wherein the second group of physical blocks at the second plane are at a different index position than the first group of physical blocks at the first plane, the different index position being based on the offset.

12. The system of claim 7, wherein the processing device is further to:

identify a subsequent system block corresponding to another plurality of logical blocks; and assign a particular group of physical blocks to a portion of the another plurality of logical blocks based on a location of the first group of physical blocks assigned to the first group of the plurality of logical blocks of the system block.

13. A non-transitory computer readable medium comprising instructions, which when executed by a processing device, cause the processing device to perform operations comprising:

identifying an offset based on a characteristic of a memory system associated with a system block, wherein the system block corresponds to a plurality of logical blocks, wherein the characteristic of the memory system corresponds to a number of memory devices that are included in the memory system and to a number of planes that are included in each of the memory devices, and wherein each of the memory devices comprises a plurality of planes;

assigning a plurality of groups of physical blocks of the memory system to the plurality of logical blocks of the system block based on the offset, wherein each of the plurality of groups of physical blocks comprise a different plurality of physical blocks;

identifying a new system block corresponding to another plurality of logical blocks;

identifying another plurality of groups of physical blocks of the memory system based on the offset and a location associated with the plurality of groups of physical blocks, wherein each of the another plurality of groups of physical block comprise another different plurality of physical blocks, and wherein a location of the another plurality of groups of physical blocks is identified based one a prior respective one of the another plurality of groups of physical blocks, wherein the another plurality of groups of physical blocks comprises at least three groups of physical blocks, and wherein the offset specifies locations of each of at least two of the at least three groups of physical blocks relative to a location of an immediately prior group of physical blocks of the at least three groups of physical blocks; and assigning the another plurality of groups of physical blocks to the another plurality of logical blocks corresponding to the new system block.

14. The non-transitory computer readable medium of claim 13, wherein to identify the another plurality of groups of physical blocks of the memory system based on the offset and the location associated with the plurality of groups of physical blocks, the operations further comprise:

identify a location of an initial group of physical blocks of the plurality of groups assigned to the plurality of logical blocks of the system block; and identify a location of a particular group of physical blocks of the another plurality of groups relative to the location of the initial group of physical blocks.

15. The non-transitory computer readable medium of claim 14, wherein to identify the another plurality of groups of physical blocks of the memory system based on the offset and the location associated with the plurality of groups of physical blocks, the operations further comprise:

identify a subsequent group of physical blocks of the another plurality of groups based on the offset and the location of the particular group.

16. The non-transitory computer readable medium of claim 13, wherein the operations further comprise:

using the system block and the new system block to store data received from a host system to the physical blocks of the memory system.

\* \* \* \* \*